(12) United States Patent  (10) Patent No.: US 7,710,830 B2
Mansmann et al.  (45) Date of Patent: May 4, 2010

(54) OUTING RECORD DEVICE

(75) Inventors: John Mansmann, North Bergen, NJ (US); Roland Knowlden, South River, NJ (US)

(73) Assignee: Accuwalk LLC, North Bergen, NJ (US)

( * ) Notice: Subject to any disclaimer, the term of this patent is extended or adjusted under 35 U.S.C. 154(b) by 46 days.

(21) Appl. No.: 12/202,572

(22) Filed: Sep. 2, 2008

(65) Prior Publication Data

US 2010/0054086 A1 Mar. 4, 2010

(51) Int. Cl.
*G04F 8/00* (2006.01)
*G04F 10/00* (2006.01)

(52) U.S. Cl. ................... 368/9; 368/107; 340/568.1

(58) Field of Classification Search ........... 368/1, 368/9, 89, 95, 4, 107; 340/568.1
See application file for complete search history.

(56) References Cited

U.S. PATENT DOCUMENTS

| | | | | |
|---|---|---|---|---|
| 4,595,922 A * | 6/1986 | Cobb et al. | ............ | 340/825.49 |
| 4,920,562 A * | 4/1990 | Hird et al. | ............ | 379/132 |
| 5,170,380 A * | 12/1992 | Howard et al. | ............ | 368/10 |
| 5,603,094 A | 2/1997 | Greear, Jr. | | |
| 6,311,644 B1 | 11/2001 | Pugh | | |
| 6,371,420 B1 * | 4/2002 | Strunk | ............ | 248/111 |
| 6,392,543 B2 * | 5/2002 | Maloney | ............ | 340/568.1 |
| 6,502,060 B1 * | 12/2002 | Christian | ............ | 702/178 |
| 6,900,741 B1 * | 5/2005 | Warnelov | ............ | 340/933 |
| 7,050,906 B2 | 5/2006 | Hathiram et al. | | |
| 7,059,275 B2 | 6/2006 | Laitinen et al. | | |
| 7,148,801 B2 | 12/2006 | Crabtree et al. | | |
| 7,209,588 B2 | 4/2007 | Liang et al. | | |
| 7,335,168 B2 | 2/2008 | Rugg | | |
| 7,342,494 B2 * | 3/2008 | Maloney | ............ | 340/568.1 |
| 2002/0180591 A1 * | 12/2002 | Berstling et al. | ............ | 340/309.15 |
| 2006/0226996 A1 | 10/2006 | Hisano | | |
| 2007/0241898 A1 * | 10/2007 | Comerford | ............ | 340/568.1 |
| 2008/0035072 A1 | 2/2008 | Lee | | |
| 2008/0256445 A1 * | 10/2008 | Olch et al. | ............ | 715/700 |
| 2009/0059728 A1 * | 3/2009 | Potash | ............ | 368/10 |
| 2009/0262606 A1 * | 10/2009 | Trost | ............ | 368/10 |

* cited by examiner

*Primary Examiner*—Renee S Luebke
*Assistant Examiner*—Sean Kayes
(74) *Attorney, Agent, or Firm*—Moser IP Law Group

(57) ABSTRACT

Provided, among other things, is an outing record device comprising, in a compact, wall-mountable device: controller with associated memory; display(s) for displaying a outing time and an outing duration time; a receiver suitable for hanging an Object; and a trigger responsive to the removal from and placement on the receiver of an object, wherein the controller records the times of removal and placement, calculates a last outing time and duration, and makes available for display on the display(s) the outing time and duration. Methods of use, for example, are also provided.

12 Claims, 6 Drawing Sheets

OUTING RECORD DEVICE

BACKGROUND

1. Field

Embodiments of the present invention generally relate to devices for timing and/or reporting information concerning an outing that uses a defined object such as a dog leash or a walking stick.

2. Description of the Related Art

In caring for an animal, it can be difficult to keep track of when it has been exercised. This is especially so if more than one party takes care of the animal. It can also be difficult for one caretaker to notify another of any special issues regarding the care of the animal, such as that the animal has diarrhea or has vomited.

Computer algorithms exist for tracking an animal, such as found in U.S. Pat. No. 6,311,644. However, what is needed is a device that, while using electronic tools, is nonetheless simple, and actuated by actions a care giver would undertake regardless of the presence of the device.

SUMMARY

Provided, among other things, is an outing record device comprising, in a compact, wall-mountable device: controller with associated memory; display(s) for displaying a outing time and an outing duration time; a receiver suitable for hanging an Object; and a trigger responsive to the removal from and placement on the receiver of an object, wherein the controller records the times of removal and placement, calculates a last outing time and duration, and makes available for display on the display(s) the outing time and duration.

In another embodiment, the invention provides a method of walking an animal comprising: providing the outing record device; removing a leash from the receiver; thereafter walking the animal; and replacing the leash, thereby causing the controller to calculate and make available for display the time of the outing and the duration of the outing. Where the Outing record device has a recording and playback device for recording and playing back at least one vocal message, a method of the invention can include recording a vocal message on the outing record device, thereby making the vocal message available for later playing

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only illustrative embodiments of this invention and are therefore not to be considered limiting of its scope, for the invention may admit to other equally effective embodiments.

Figure 1:
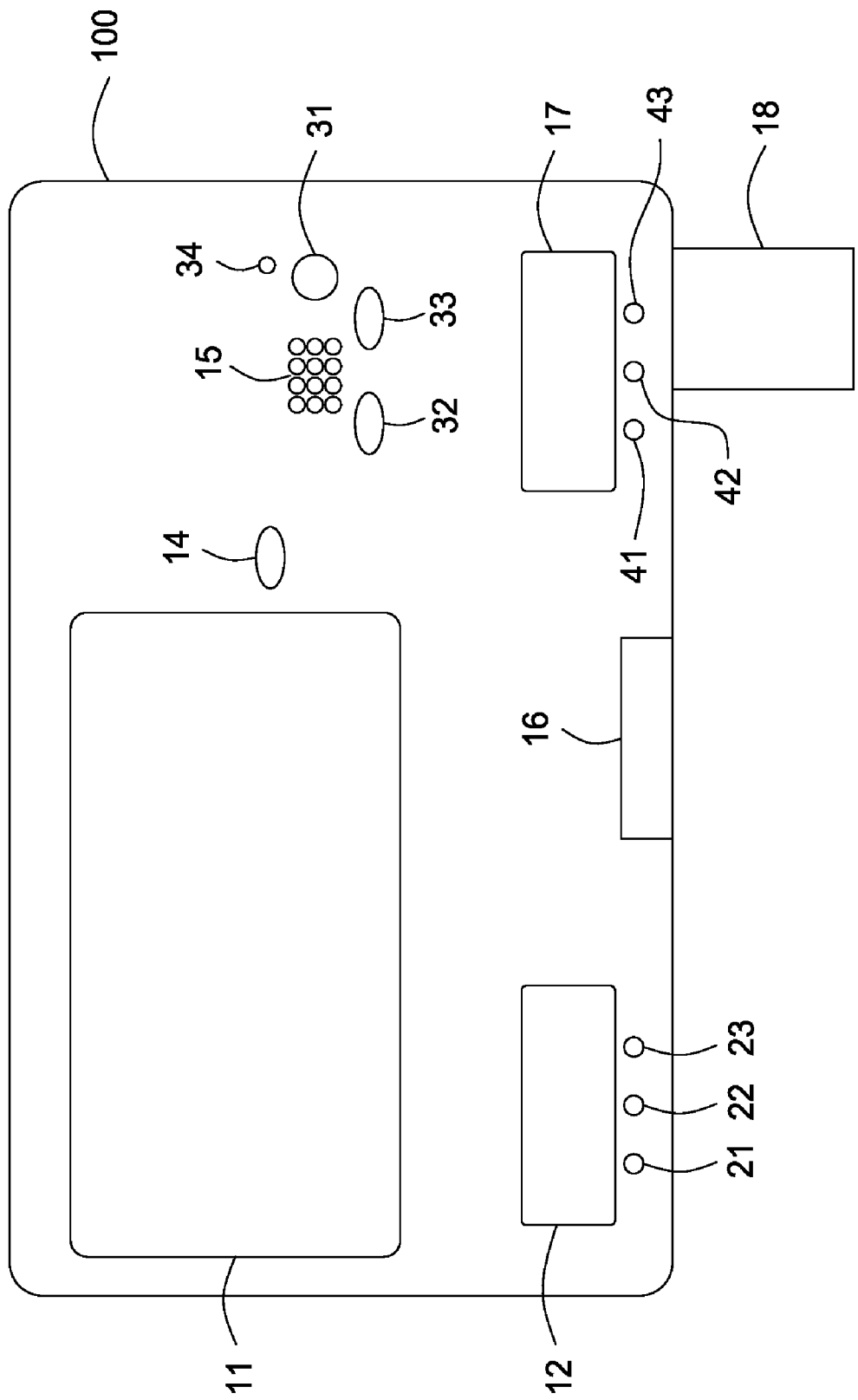
FIG. 1 depicts an embodiment of the outing record device (front view).

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

While an important use for the outing recording device is for recording an outing with a pet, the device can be used with any outing that requires the use of an Object that can trigger the device (as described below). Hence, it could be used to record the time out as triggered by, for example, a bike, a hiking pole, running shoes, biking cleats, a yoga mat, and the like. Or, one can develop the habit of using an Object in conjunction with an activity, such that taking and storing the Object with the device provides feedback on how much time is spent in the activity.

An outing record device 100 of the invention, such as the one illustrated in FIG. 1, can have:

A battery light that blinks when the device needs a new or recharged battery, or needs charging.

A display 11 that can incorporate a last time triggered display ("LTTD") that can display the last time the Object was removed from the hook, as triggered by a sensor. The display 11 can further incorporate a duration time display ("DTD") that can display the duration of the time the sensor was triggered by removing and returning the Object. As illustrated, this DTD can be a displayed by the same display device as the LTTD. As discussed below, the LTTD can be cycled back to earlier Outings. As such, there can be a display reading an indication of which outing is currently displayed (such as "most recent", "$2^{nd}$ most recent", etc.) This display (not shown), can also be incorporated into the same display device. The LTTD can include a date, or indication of which outing can include a date.

A review button 14 cycles the LTTD to previous outings.

A reset button (not shown) can reset the device to void out an apparent outing—for example caused by the Object being accidently displaced. As with many of the control buttons outlined here, this button can be placed on the rear of the outing record device.

A current time display ("CTD") 12, if present, has a display for the current time. The current time display can be controlled, for example, with set button 21 for triggering set mode and cycling the portion of the time display to be set (hours, minutes, seconds (if displayed), month (if displayed), day (if displayed), or the like), + button 22 for advancing a current time setting, and – button 23 for regressing a current time setting. As will be recognized, the current time can be incorporated into another display, such as display 11, with the display displaying an identifier of the particular information being outputted.

A speaker 15 and a microphone 31, illustrated with associated Record button 32 (for triggering the recording a message to be and played from the speaker) and associated Play button 33. Indicator 34 can be, for example, a red light that blinks when there is an un-played message on the outing record device.

A Receiver 18 that receives the Object, triggering a mechanical, optical, electric or magnetic trigger switch 19 (see FIG. 2) that sends a signal to a controller. The receiver can be a hook, ring, or the like, which is suitable for hanging the object. The receiver is associated with a trigger switch. For example, hanging a leash can activate a trigger switch by gravity action on a mechanical, optical, electric or magnetic switching mechanism. Gravity can move a mechanism to open or close an optical pathway, to open or close an electrical pathway, magnetically generate a current, or the like. An optical or electrical pathway can be opened or closed by the presence of the Object, regardless of any gravity action. In one embodiment, a pressure sensor (such as a piezoelectric pressure sensor) is used to determine if the Object is on the receiver. Piezoelectric sensors can be made, for example, from piezoelectric ceramics and single crystal materials, such as gallium phosphate, quartz, tourmaline, and the like. In another embodiment, one type of sensor is used in conjunction with another, so as to reduce false readings.

Figure 3A:
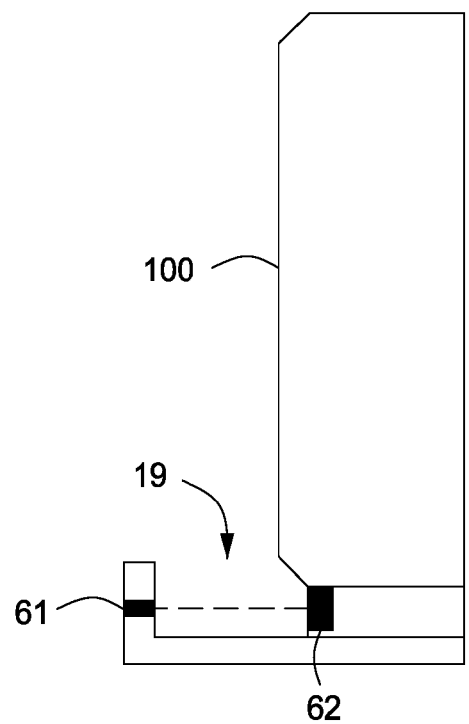
FIGS. 3A and 3B show side views of embodiments of the outing record device.
Figure 3B:
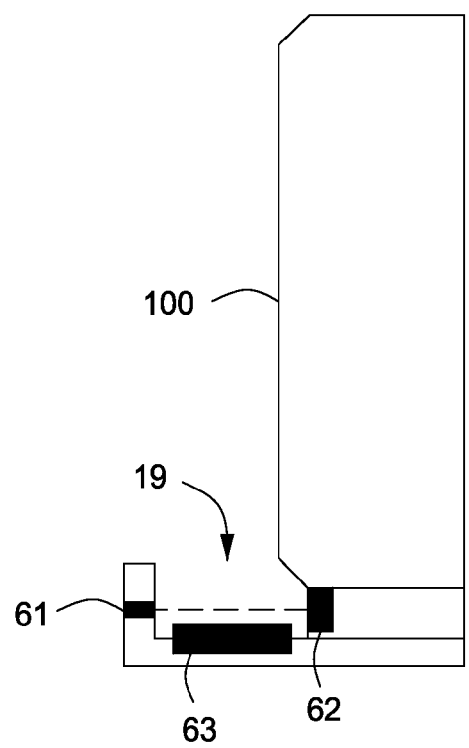

Certain embodiments of the trigger 19 are illustrated in FIGS. 3A and 3B. In FIG. 3A, the trigger has a light emitter 61 (such as an LED, a laser diode, or the like) and a light detector 62. When the light path indicated by the dashed line is disrupted, the controller 50 recognizes that the Object is in place; when the path is clear, the Object is in use. As should be apparent, the positions of the light emitter and detector can be reversed. The light emitter can emit light constantly, or periodically, so long as light is emitted frequently enough that the duration of an outing can be determined to within a margin of error. FIG. 3B shows an embodiment where the trigger is dependent on two indicators of Object use: light as in FIG. 3A, and weight, as detected by pressure sensor 63. This embodiment can control for false readings. The controller can deem the Object not in place unless both detecting mechanisms so indicate, or can time an outing based on one detecting mechanism, but indicate the ambiguity in the display output. (E.g., Outing not indicated by optical detector, see owner's manual.)

A second (or third, or fourth, etc) Receiver 16 can be present. Typically, such additional receivers do not trigger the device, as for example a dog owner might typically walk two dogs at the same time, such that triggering with the first receiver is a stand-in for what is happening with the second. The illustrated second Receiver can be pulled out of the outing record device and retracted back into the outing record device when not in use. In certain embodiments, additional receivers are also associated with mechanisms to trigger the outing record device. In such cases, the controller (discussed below) will typically keep track of which receiver has been triggered, and modify the output at the display (or displays) accordingly. The output at the speaker can also be modified, for example with an electronically generated voice such as "Message for Fido's leash," or "Message for Ann's walking stick."

An identifier display 17 can be present, together with adjustment controls, such as set button 41, + adjust button 42 and − adjust button 43. As will be apparent, this display can be rolled into one of the other above-described displays, with the display displaying an identifier of the particular information being outputted. Operation of the set/adjust buttons can be: depress set for 3 sec, first letter position blinks, use + to advance from "A", and − to advance from "Z", depress set to advance to next letter position, and so forth. The outing record device can note that one is finished inputting by timing out, or by the user again depressing set for 3 sec. (or the like). The set button 41, + adjust button 42 and − adjust button 43 can be consolidated with the previously outlined set buttons, using button combinations as is known in the art to cycle through which function (e.g., name, current time) is being set.

Figure 2:
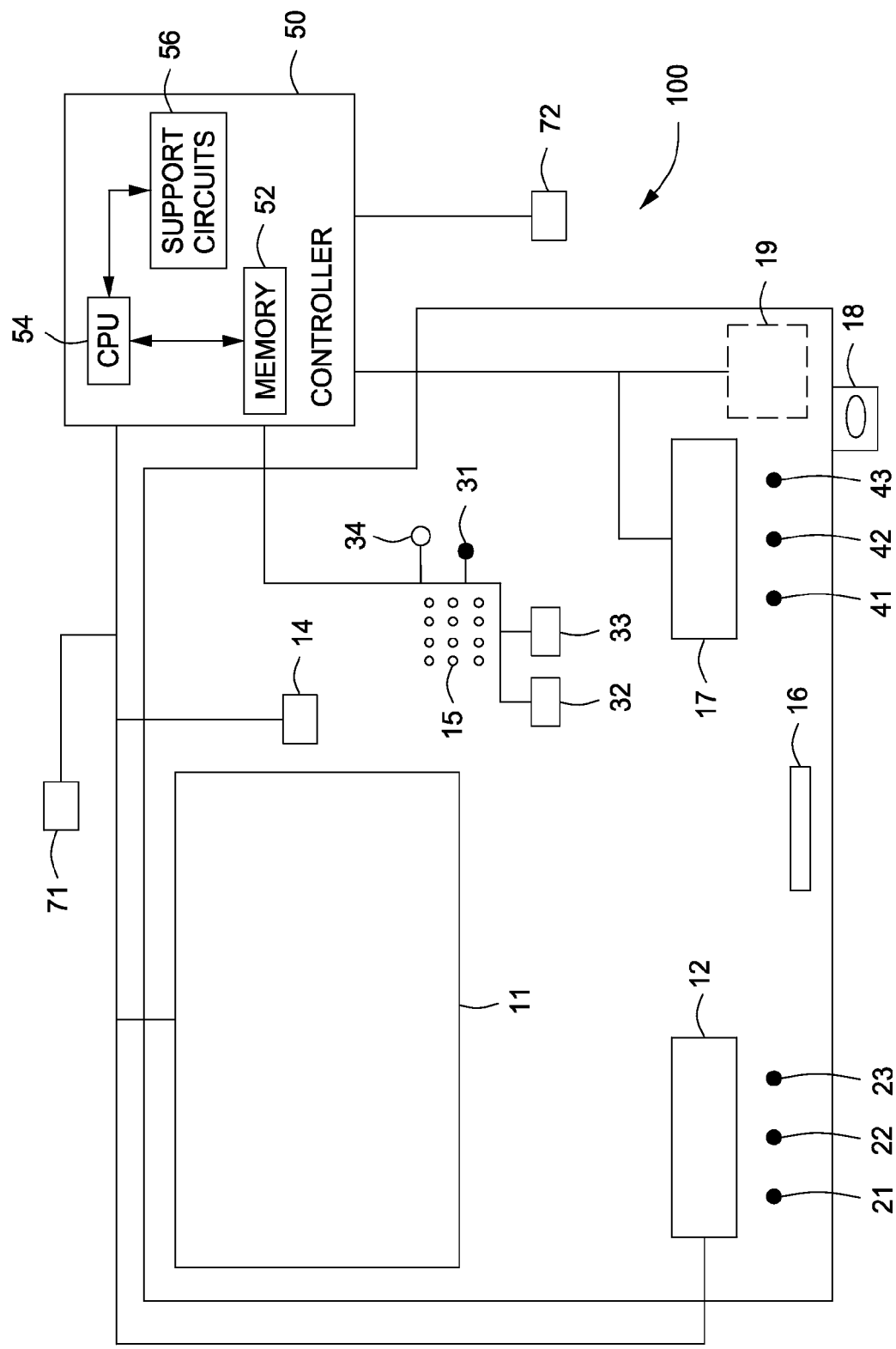
FIG. 2 depicts an embodiment of the outing record device.

The outing record device 100 drawn more conceptually in FIG. 2. FIG. 2 shows trigger 19 and controller 50. The controller 50 comprises a central processing unit (CPU) 54, a memory 52, and support circuits 56 for the CPU 54 and is coupled to and controls the various elements of the outing record device 100 or, alternatively, via computers (or controllers) associated with outing record device. The controller 50 may be one of any form of general-purpose computer processor that can be used in an industrial setting for controlling various chambers and sub-processors. The memory, or computer-readable medium, 52 of the CPU 54 may be one or more of readily available memory such as random access memory (RAM), read only memory (ROM), flash memory, floppy disk, hard disk, or any other form of digital storage, local or remote. In certain embodiments, the memory is sufficient to retain 30 days or more of time and duration data for outings. The support circuits 56 are coupled to the CPU 54 for supporting the processor in a conventional manner. These circuits include cache, power supplies, clock circuits, input/output circuitry and subsystems, and the like. The inventive method may be stored in the memory 52 as software routine that may be executed or invoked to control the operation of the reactor 100 in the manner described herein. The software routine may also be stored and/or executed by a second CPU (not shown) that is remotely located from the hardware being controlled by the CPU 54.

Control lines are shown from the controller 50 to a number of systems of the outing record device. It will be recognized that a control line for a current time display 12 or an identifier display 17 will include control of the buttons that provide input controls for the displays. Control lines can include lines to a reset button 71 (shown without set location). It will be recognized that the controller 50 will generally be incorporated into a common housing with the other features of the outing record device. The outing record device can be battery or fuel cell powered in many embodiments, but can also be powered from an outlet, such as via an appropriate AC/DC converter.

The outing record device is designed to simply provide for an outing record. That simplicity of use does not foreclose using the device to provide data to more complex recording keeping systems. For example, the controller 50 can connect to an output device 72 (which can be an input/output device), such as a USB port, a firewire port, a Bluetooth wireless transmission device, a wireless device using any communication protocol, or the like. Queries can be received by the controller through the output device, causing the controller to download data via the output device.

In one illustrative method of initializing the device (or restarting after sufficient time for internal memory to be lost, or restarting after a reset operation), the device can operate as follows:

Both Last Time Triggered Display LTTD and the Current Time Display CTD will start blinking meaning you need to set it.

To set the CTD Press the Set Time button for X seconds and the hour digits will blink you can press the + or − buttons to adjust the time to the current time. Press the Set button to jump to the minute digits. Press + or − to set the time. Press the Set button to jump to the AM/PM to set.

The LTTD will stop blinking once the set button is press but will not change as the CTD is set.

Record button—Press and hold for 3 sec to begin record mode, and release to stop recording—Record memo indicator will blink or a beep sound will indicate time to record.

Play button—Press the play button to listen to the recorded message.

Review button—For each press of the button the display will cycles back to the previous LTTD times sequentially in memory. After button is released (for example for 7 seconds) it reverts back to the current date LTTD The start-up protocol (such as illustrated above) can be triggered, for example, by putting in batteries for the first time, or after internal, user-inputted memory has been lost. Or, the start-up protocol can be triggered by a reset procedure, such as the sustained depression (e.g., 3 seconds) of a recessed button (not shown).

Figure 4:
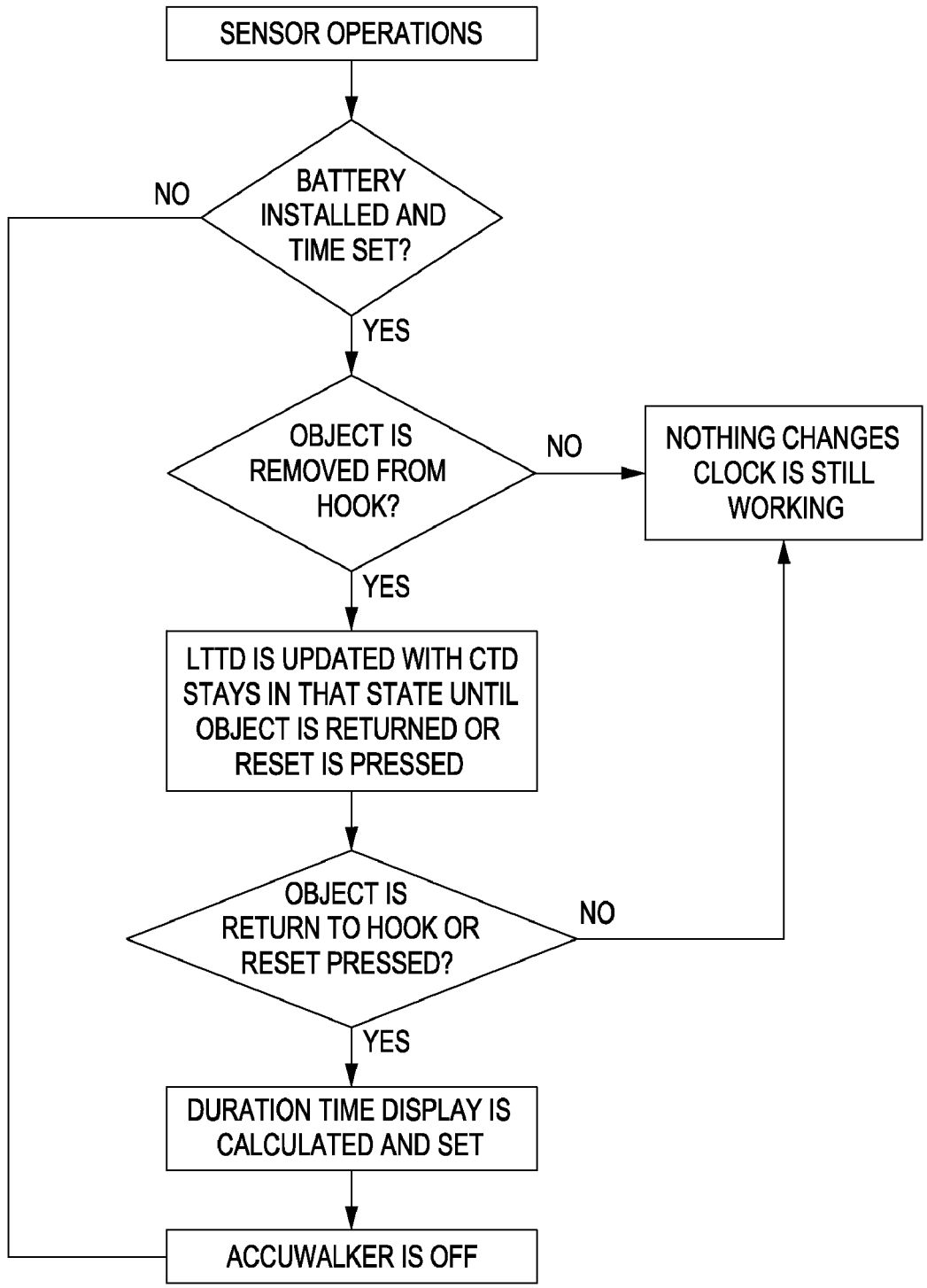
FIGS. 4-6 show flow charts for exemplary operations of the outing record device.

Operation of the device can be in accordance with the flow chart of FIG. 4. When trigger 19 is activated by removing the Object, the LTTD is modified to display the time of the triggering. The outing record device keeps track of the time. When the trigger 19 is activated by the return of the Object, the DTD is modified to display the time duration of the outing. In certain embodiments, LTTD and/or the DTD may be displayed after prompting, or these may go into sleep mode, such that the display becomes active after prompting. For example, if in sleep mode, the review button 14 may prompt display of the most current last time out and duration.

Figure 5:
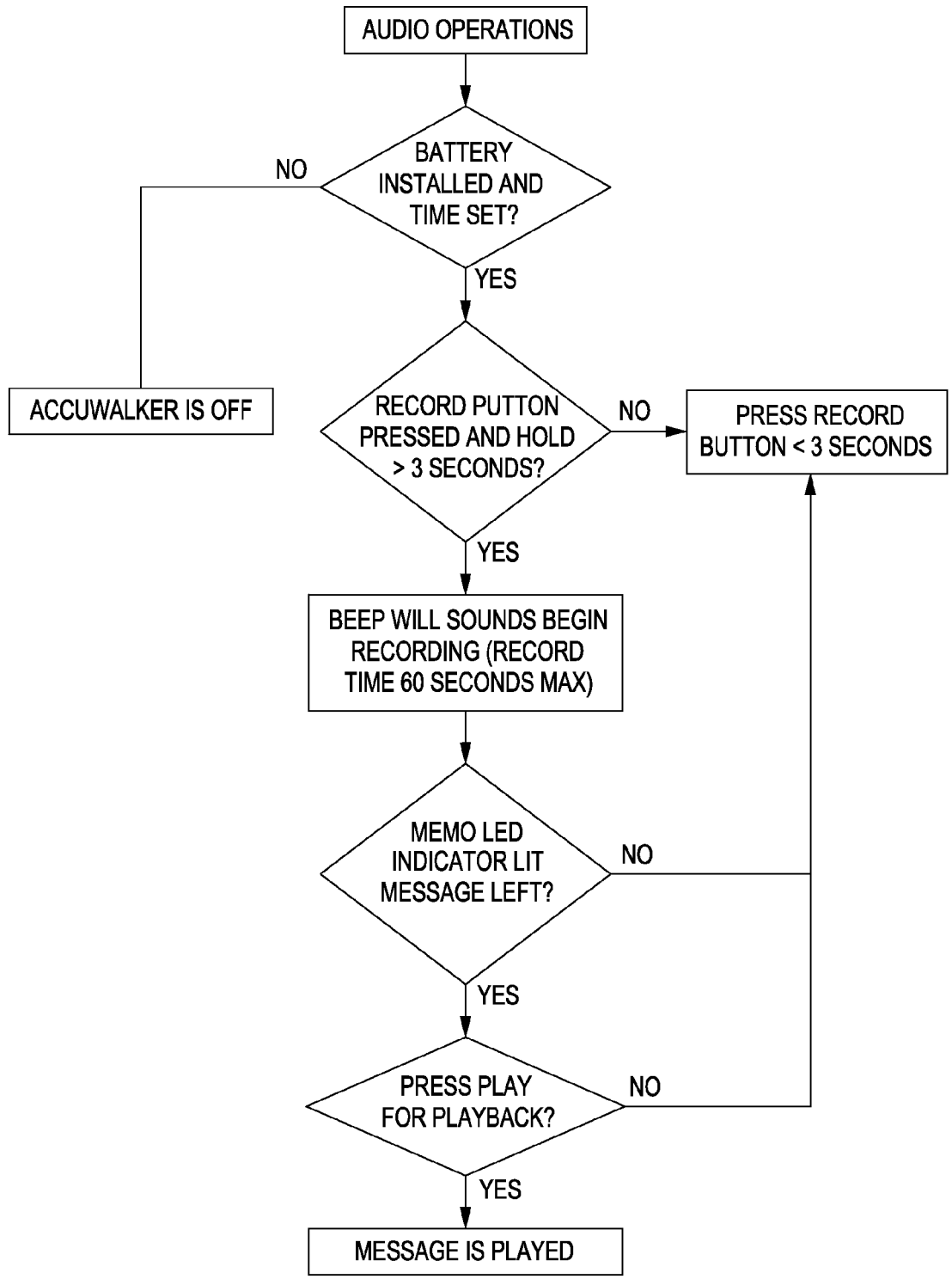
Figure 6:
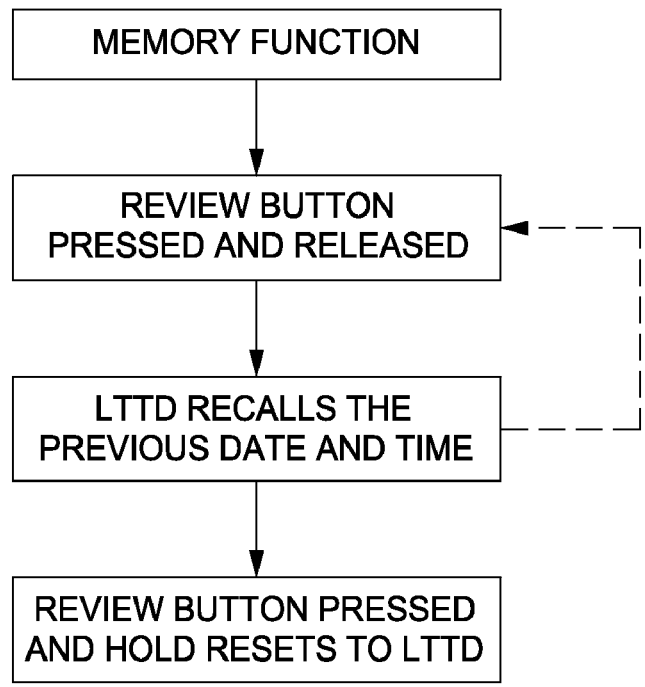

Audio operations can be in accordance with the flow chart of FIG. 5. When record button 32 is pressed, for example for a period of time sufficient to discriminate accidental depressions of the button, the outing record device is ready for recording, as may be indicated by a beep, a visual display, or the like. In certain embodiments, the record button 32 must be kept depressed from activation through to the end of recording. Thus, in this embodiment, releasing the button can signal that one no longer wishes to record. In one illustrative embodiment, there is a time limit for recording a message, such as the 60 seconds indicated in FIG. 5.

Recycle operations can be in accordance with the flow chart of FIG. 5. When review button 14 is pressed and released, for example, the LTTD displays the previous time triggered, by date and time. Typically, the previous duration is also displayed. The review button 14 can be repeatedly pressed and released to cycle further back through previous times triggered. The number of times triggered that can be cycled through can be, for example, those occurring in the last month. Of course, the limit can be simply the limit of memory allocated for this purpose (fluidly or fixedly allocated). In some embodiments, memory 52 can be supplemented with additional memory, such as flash memory that can be inserted into an appropriate slot in the outing record device. As illustrated, a sustained pressing of recycle button 14 can return the outing record device to the most current time triggered. Alternatively or in supplement, the outing device returns to the most current time triggered after an amount of time since the last activation of the recycle button 14.

As illustrated in FIG. 1, the outing record device can announce in permanent ink that the main output of display 11 is the initial time of the last outing. In other embodiments, the electronic display can provide this information. Such information can be displayed in a different sub-field, or at a different time, such as immediately before displaying the relevant last outing time (or cycling from one display to the other).

The display can be cycled to other outings, such as by depressing the review button. The user can keep track of which outing by how many times he or she has depressed the review button, or the display can include such identifying information as:

| | |
|---|---|
| If within the week (review pressed after first Wed. outing): | $2^{nd}$ Tues Outing 7:54 p. duration 40 min<br>$1^{st}$ Tues Outing 6:45 a, duration 20 min<br>$1^{st}$ Mon Outing 6:45 a, duration 20 min<br>$3^{nd}$ Sun Outing 5:05 p, duration 50 min<br>$2^{nd}$ Sun Outing 1:12 p, duration 30 min<br>$1^{st}$ Sun Outing 9:54 a, duration 20 min |
| If outside the week: | $2^{nd}$ Tues, 5 Aug Outing 7:45 p, duration 33 min |

The display can be sized to display all of this information, and additional information, in distinct fields as needed to help distinguish separate types of information. Or, the display can cycle through distinct segments of the information: such as date of the outing, followed by time of the outing, followed by duration. Or combinations of the approaches can be used.

The display can be any display suitable for use in a relatively small, preferably wall-mounted, device. For example, LED, OLED, LCD, back-lit LCD, plasma, and the like can be used to provide the display.

In certain embodiments, there is one message that can be recorded. In other embodiments, multiple recordings can be recorded. A synthetic voice can provide envelope information on the time of recording, including for example if just before, during or after a particular outing. The envelope information can be automatically provided, or provided upon prompting. If multiple recordings are provided, they may be serially provided in much the same way as display output is provided. For example, one could prompt for the previous recording by pressing the play button 33 at the end of a recording, by pressing the play button 33 at the same time as the record button 32, by pressing an additional button for this purpose (not shown).

Figure 7:
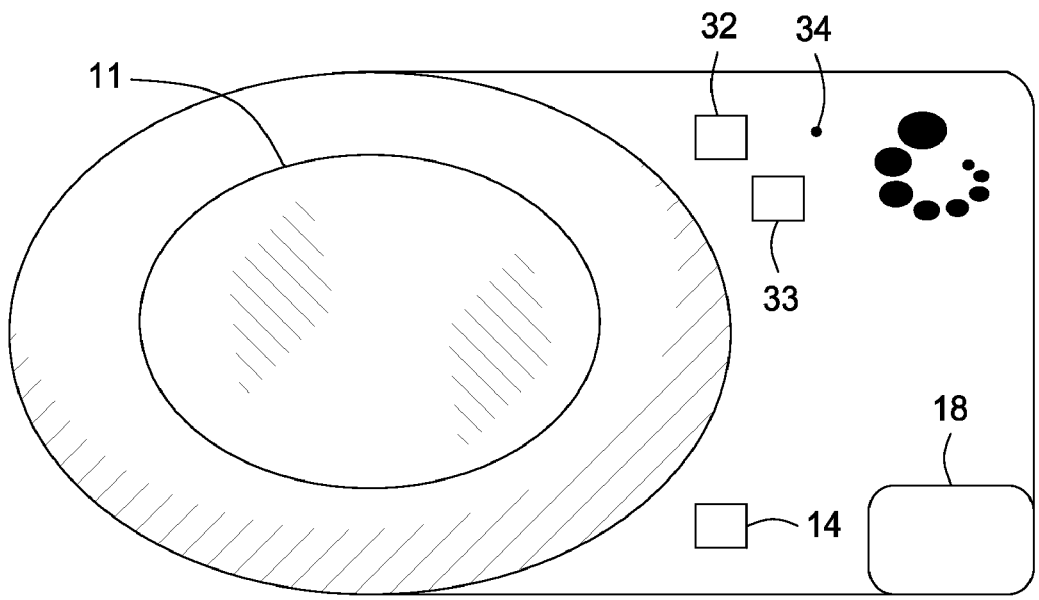
FIG. 7 depicts an embodiment of the outing record device (front view).

Shown in FIG. 7 is an alternative embodiment in which the LTTD, DTD and CTD are consolidated into a single display 11.

Additional numbered exemplary embodiments include:

Embodiment 1

An outing record device comprising, in a compact, wall-mountable device: a controller with associated memory; display(s) for displaying a outing time and an outing duration time; a receiver suitable for hanging an Object; and a trigger responsive to the removal from and placement on the receiver of an object, wherein the controller records the times of removal and placement, calculates a last outing time and duration, and makes available for display on the display(s) the outing time and duration.

Embodiment 2

The outing recording device of embodiment 1, further comprising, in the compact, wall-mountable device: a recording and playback device for recording and playing back at least one vocal message.

Embodiment 3

The outing recording device of one of the foregoing embodiments, wherein the display(s) display the current time.

Embodiment 4

The outing recording device of one of the foregoing embodiments, wherein the display(s) consist of a single display.

Embodiment 5

The outing recording device of one of the foregoing embodiments, further comprising a review button effective to cause the controller to make available for display on the display(s) an immediately previous outing time and duration.

Embodiment 6

The outing recording device of one of the foregoing embodiments, wherein the trigger (i) operates in response to the opening or closing of an optical pathway, (ii) comprises a pressure sensor, or (iii) both (i) and (ii) obtain.

Embodiment 7

The outing recording device of one of embodiments, wherein the trigger operates in response to the opening or closing of an optical pathway.

Embodiment 8

The outing recording device of one of embodiments, wherein the trigger comprises a pressure sensor.

Embodiment 9

The outing recording device of one of embodiments, wherein both (i) and (ii) obtain.

Embodiment 10

The outing recording device of one of embodiments, wherein the receiver is sized and arranged for receiving an animal leash.

Embodiment 11

A method of walking an animal comprising: providing the outing record device of one of the foregoing embodiments; removing a leash from the receiver; thereafter walking the animal; and replacing the leash, thereby causing the controller to calculate and make available for display the time of the outing and the duration of the outing.

Embodiment 12

A method of walking an animal comprising: providing the outing record device of one of the foregoing embodiments 2-10; removing a leash from the receiver; thereafter walking the animal; recording a vocal message on the outing record device, thereby making the vocal message available for later playing; and replacing the leash, thereby causing the controller to calculate and make available for display the time of the outing and the duration of the outing.

Thus, methods and apparatus for an outing record have been provided herein that provide improved facility in recording the data, and improved communication between collaborators, such as a spouses that care for an animal.

While the foregoing is directed to embodiments of the present invention, other and further embodiments of the invention may be devised without departing from the basic scope thereof, and the scope thereof is determined by the claims that follow.

What is claimed is:

1. An outing record device comprising, in a compact, wall-mountable device:
   a controller with associated memory;
   display for displaying an outing time and an outing duration time;
   a receiver suitable for hanging an object; and
   a trigger responsive to the removal from and placement on the receiver of an object, wherein the controller records the times of removal and placement, calculates a last outing time and duration, and makes available for display on the display(s) the outing time and duration.

2. The outing recording device of claim 1, further comprising, in the compact, wall-mountable device:
   a recording and playback device for recording and playing back at least one vocal message.

3. A method of walking an animal comprising:
   providing the outing record device of claim 2;
   removing a leash from the receiver;
   thereafter walking the animal;
   recording a vocal message on the outing record device, thereby making the vocal message available for later playing; and
   replacing the leash, thereby causing the controller to calculate and make available for display the time of the outing and the duration of the outing.

4. The outing recording device of claim 1, wherein the display displays the current time.

5. The outing recording device of claim 3, wherein the display consists of a single display.

6. The outing recording device of claim 1, further comprising a review button effective to cause the controller to make available for display on the display an immediately previous outing time and duration.

7. The outing recording device of claim 1, wherein the trigger (i) operates in response to the opening or closing of an optical pathway, (ii) comprises a pressure sensor, or (iii) both (i) and (ii).

8. The outing recording device of claim 6, wherein the trigger operates in response to the opening or closing of an optical pathway.

9. The outing recording device of claim 7, wherein the trigger comprises a pressure sensor.

10. The outing recording device of claim 7, wherein the trigger (i) operates in response to the opening or closing of an optical pathway and (ii) comprises a pressure sensor.

11. The outing recording device of claim 7, wherein the receiver is sized and arranged for receiving an animal leash.

12. A method of walking an animal comprising:
    providing the outing record device of claim 1;
    removing a leash from the receiver;
    thereafter walking the animal; and
    replacing the leash, thereby causing the controller to calculate and make available for display the time of the outing and the duration of the outing.

* * * * *